March 14, 1967 R. K. NOLTE 3,308,838
BAKING PAN CLEANING APPARATUS
Original Filed Oct. 28, 1963 4 Sheets-Sheet 1
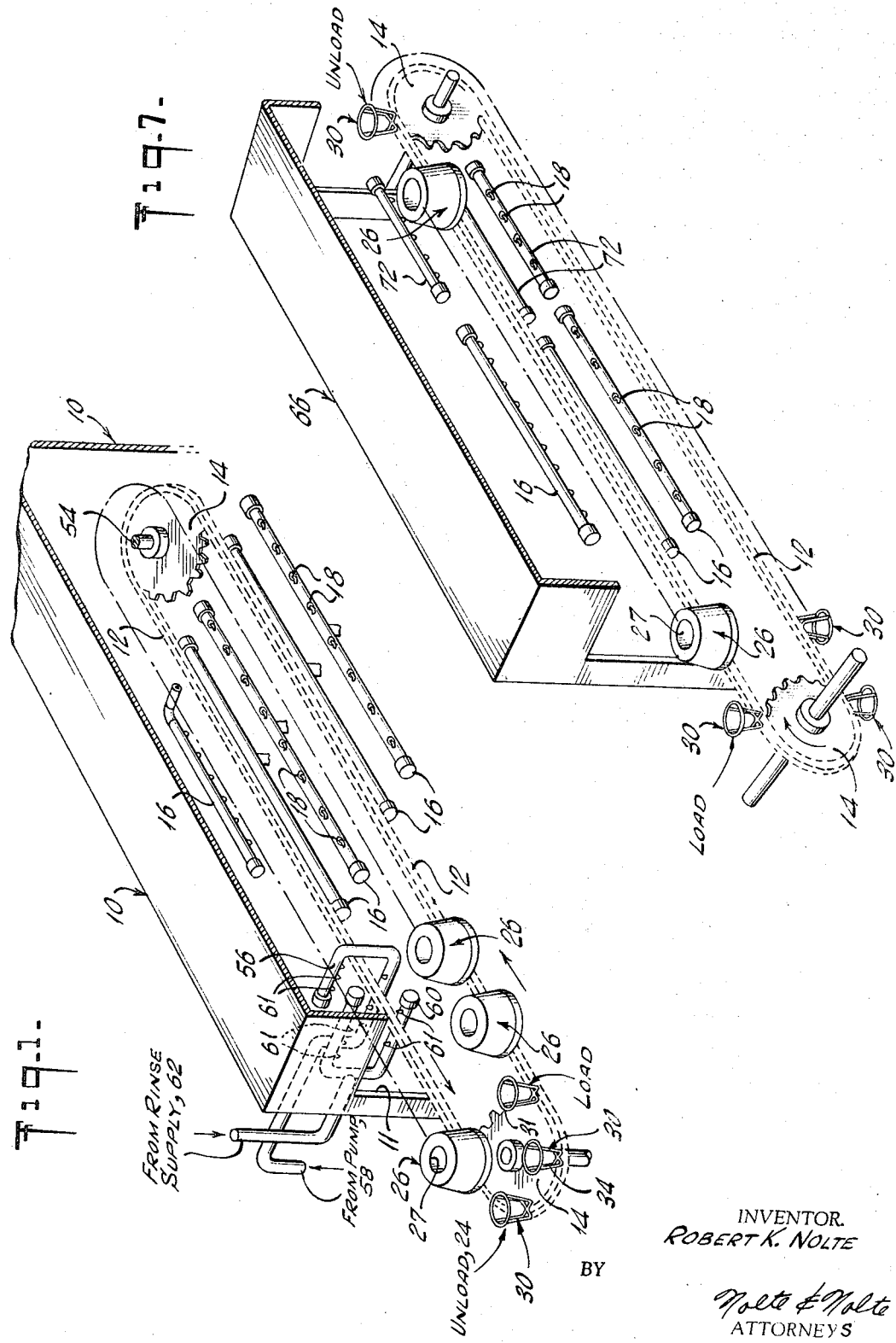
INVENTOR.
ROBERT K. NOLTE
BY
Nolte & Nolte
ATTORNEYS

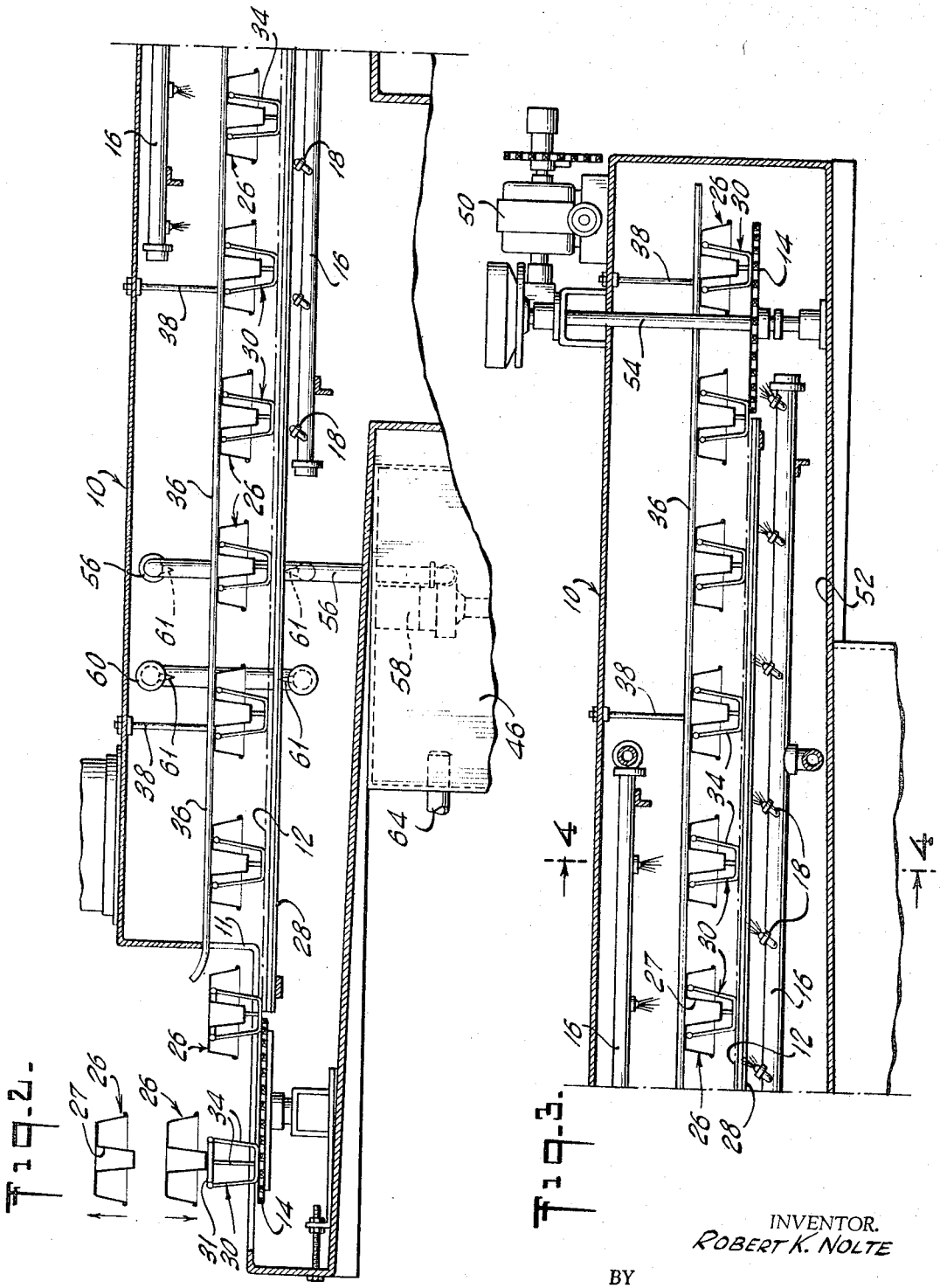

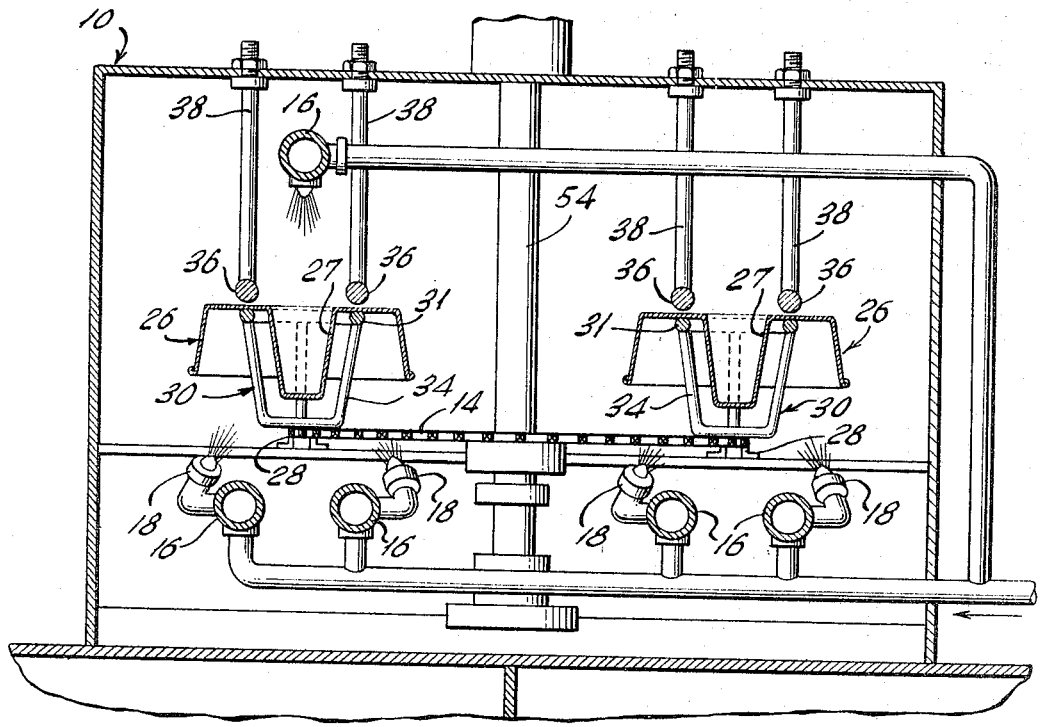

March 14, 1967 R. K. NOLTE 3,308,838
BAKING PAN CLEANING APPARATUS
Original Filed Oct. 28, 1963 4 Sheets-Sheet 4
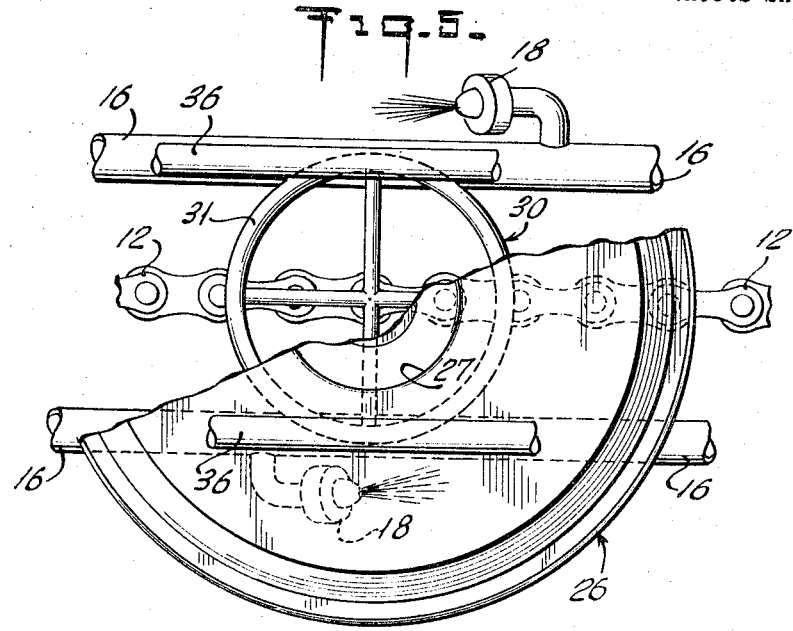
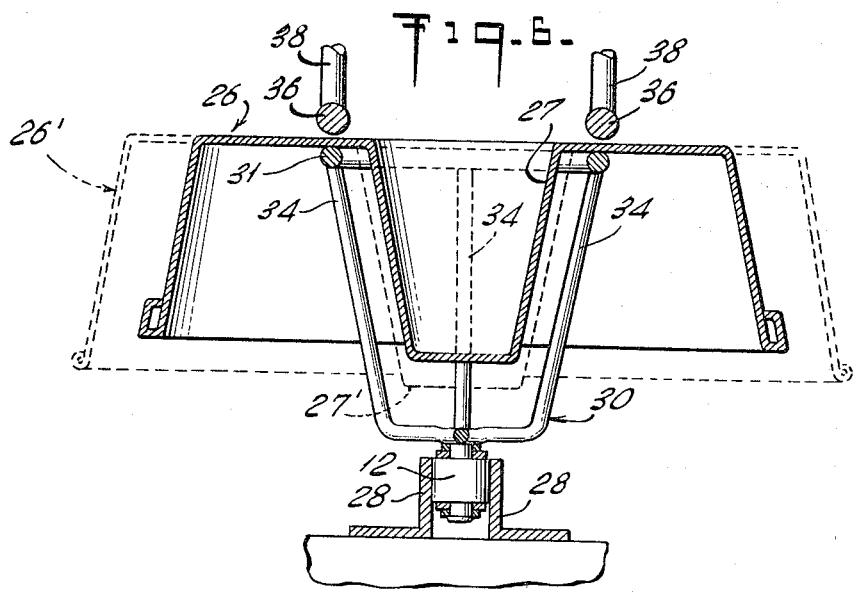
INVENTOR.
ROBERT K. NOLTE
BY
Nolte & Nolte
ATTORNEYS 3,308,838
BAKING PAN CLEANING APPARATUS
Robert K. Nolte, Chatham, N.J., assignor to Metalwash Machinery Corporation, Elizabeth, N.J., a corporation of New Jersey
Continuation of abandoned application Ser. No. 377,458, June 18, 1964, which is a continuation of abandoned application 319,274, Oct. 28, 1963. This application Apr. 7, 1966, Ser. No. 541,025
7 Claims. (Cl. 134—70)

This application is a continuation of applicant's copending application Ser. No. 377,458, filed June 18, 1964, now abandoned, which application is itself a continuation of a first application Ser. No. 319,274, filed Oct. 28, 1963, now abandoned.

This invention relates to bakery pan washing machines in general, and in particular to improvements in pan holding means for supporting bakery pans of different sizes and depths as they travel through a conveyorized washing machine.

More specifically, the present invention relates to an improved form of angel food pan holding arrangement for use in a pan washing machine of the type disclosed in applicant's prior U.S. Patent No. Re. 25,421, March 23, 1963.

In the bakery pan washing machine disclosed in applicant's prior patent, the pans are placed in inverted fashion over a plurality of pan holding baskets traveling through a washing tunnel on a moving conveyor. As they pass through the tunnel they are subjected to a plurality of high pressure wash and rinse sprays which rotate the pans relative to the conveyor and tend to lift each of the pans off their supporting basket. Accordingly, the machine of the applicant's prior patent employed a hold down bar disposed above the inverted pans to limit the upward travel thereof during their passage through the washing tunnel of the machine. To permit the washing of various heights or depth bakery pans, the pan hold down bar of applicant's prior patent was vertically adjustable to accommodate the various depth pans, traveling through the washer. Obviously, this pan hold down arrangement required frequent adjustment by the machine operator when pans of different heights were to be washed. Furthermore, because pans of different depths present an uneven upper boundry washing of intermixed size pans was impossible.

The present invention is directed toward an improved pan supporting means for use in a machine of the type described wherein no adjustment of the pan hold down means is required and wherein pans of various heights may be washed without the need for any machine adjustment.

The novel pan support of the invention includes an upstanding cup shaped basket member having a circular peripheral rim about the upper mouth portion thereof. The height of the basket is proportioned to be in excess of all of the vertical heights of any foreseeable angel food pan central hole coring member. The diameter of the basket is also proportioned to be in excess of all conceivable hole coring member diameters. In this way, all angel food pans placed in inverted fashion over the holding basket will be supported by the upper rim portion of the basket contacting the interior or bottom surface of the pan. Because each inverted pan will rest upon the uppermost portion of its respective supporting basket, all the pan bottoms will assume the same horizontal height as they travel through the machine. The aligned horizontal relationship of the pan bottoms as they travel through the machine permits the use of a fixed position hold down bar. Accordingly, the machine of the present invention is capable of washing, in random sequence, pans of various depths without any adjustment or relocation of the pan hold down means. Another feature of this arrangement is that angel food pans with or without an aperture in the central hole coring member may be processed.

Accordingly, it is a principal object of the present invention to provide an improved pan support means for a conveyorized pan washer wherein the need for an adjustable hold down means to accommodate pans of various heights is eliminated.

Another object of the invention is to provide a novel pan support means capable of uniformly supporting various height pans in a uniform horizontal and aligned relationship.

Another object of the invention is to provide a conveyorized pan washer capable of accepting, at random, various depth cake pans in inverted fashion.

Other objects and advantages of the invention will become apparent and the invention will be fully understood from the following description and drawings, in which:

FIG. 1 is a schematic perspective view with portions broken away of a conveyorized washing machine including the invention;

FIG. 2 is a partial elevational view in section of the left hand portion of the embodiment of FIG. 1;

FIG. 3 is a partial elevation view in section of the right hand portion of the embodiment of FIG. 1;

FIG. 4 is a cross-sectional view taken along line 4—4 of FIG. 3;

FIG. 5 is an enlarged top plan view of a support bracket and pan with portions broken away;

FIG. 6 shows a cake pan in cross-section mounted upon the support bracket of the invention in relation to the hold down means; and FIG. 7 is a perspective view with portions broken away of another embodiment of the invention.

Referring to FIGS. 1 to 6 of the drawings, a machine housing 10 has therein an endless conveyor chain 12 mounted about a pair of end sprockets 14. One end of the conveyor 12 extends outside the housing 10 through an entrance way 11 to provide a baking pan loading and unloading section. The sprocket 14 within the housing 10 is suitably driven by a motor 50 through conventional gearing and a vertically disposed drive shaft 54 (FIG. 3). Longitudinally disposed along the conveyor path are a plurality of high pressure washing water supply headers 16. Two headers are employed below the conveyor path to direct high pressure sprays upwardly into the interior of the inverted cake pan while an upper header is employed directly over the conveyor path to direct washing water downward over the pan exterior (FIG. 4).

The lower headers 16 are arranged in pairs and carry a plurality of inclined nozzles 18 which direct a high pressure liquid spray upwardly into the inverted cake pan 26 to impart rotation to the latter. The cake pan 26 is pivotally supported on a pan basket generally designated 30 secured to the moving conveyor.

Each pan basket 30 includes a plurality of upstanding spoke members 34. The upper ends of the spokes 34 are secured to a circular ring member 31 (see FIG. 6). The vertical height of the spoke members 34 is selected to be greater than any foreseeable height of the central hole coring member 27 of the inverted pan 26. Located above the conveyor in line with the path traveled by the moving pan support baskets 30 are a pair of parallel guide bars 36. Each of the guide bars 36 is fixedly secured by a support rod 38 to the upper wall portion of the housing 10 (see FIGS. 1 and 2). The positioning of the guide bars 36 relative to the conveyor and baskets 30 is permanent and best indicated in FIG. 6, wherein a small clearance is provided between the lower portion of the bars and the upper surface of the pans. It will be appreciated that upon operation of the spray nozzle 18 that each pan 26 will be lifted from the ring member 31 and rotated relative to the bars 36. In FIG. 6, an alternate pan 26' is indicated in dotted lines which possesses a different depth. As may be seen, this alternate depth pan 26' includes a central hole coring member 27' of considerably greater height than member 27. Nevertheless, the pan 26' assumes the same position on the top of the rim 31 relative to the guide bars 36, in view of the fact that ample clearance within the basket 30 is provided. In this way, even though the pan is of a different depth it may be washed by the machine without recourse to adjustment of the hold down bars 36 as required in applicant's prior patented apparatus.

The endless conveyor 12 is suitably supported and guided by a pair of opposed angle brackets 28 (FIG. 6). The conveyor 12 carries a plurality of spaced basket-like members 30, as previously mentioned, for rotatably holding each cake pan to be washed.

In operation the invention would be loaded at the loading station with soiled cake pans which would be inserted over each basket manually by a machine operator. As the conveyor travel progressed, each pan would be carried above the inclined rotation imparting nozzles 18 which would cause a counterclockwise rotation to be imparted to the cake pan. As the pan progressed down the length of the conveyor each dirty section of the pan is successively subjected to the high pressure nozzle spray to efficiently clean all portions of the inside of the pan. This technique has been found particularly useful in cleansing pans of the angel-food type, wherein the baking residue has been found unusually hard to remove, and not readily accomplished by conventional pan cleaning machines. For this reason, it has been found that higher cleaning efficiency is obtained by rotating the pans and by employing a high pressure 100 p.s.i. water spray at a temperature of 180° F. Prior to reversing direction on the conveyor belt, the spray nozzles terminate to allow the pans to make the turn at the end of the conveyor without being raised off the baskets by the force of the spray nozzles, whereupon re-entry to a second stage washing station is made on the return path of the conveyor. Just prior to exit through the aperture 11 near the unloading station 24, a two-step rinsing sequence is entered. For this purpose a U-shaped first rinse supply pipe 56 sprays water in all directions about the pan exiting from the conveyor washing section. The water supply for the first rinse header 56 is obtained from the rinse water sump tank 46 and forced upwardly by a rinse pump 58 to the first stage rinse header 56. Upon leaving the first stage rinse the pans pass through a second stage rinse header 60 which is connected at 62 to a clean water supply. Spaced about the rinse headers 56 and 60 are a multiplicity of spray nozzles 61. The drainage from this second clean water rinse is collected in the rinse water sump 46 to be recirculated, as previously mentioned, by the first stage rinse pump 58 to thereby accomplish considerable water saving. The rinse sump 46 is provided with a conventional overflow outlet 64 in the side thereof. A similar wash conservation is accomplished by recovering the drainage collected by the inclined portion 52 in the wash water sump 48 in the lower portion of the housing 10 from where it may be recirculated in well known fashion to accomplish continued washing.

In the embodiment shown in FIG. 7, a similar washing machine is shown employing the same novel pan holder. In this form the loading and unloading stations are disposed at opposite ends of the housing 66. Running along the length of the housing through apertures at either end thereof is a similar conveyor 12 driven by a pair of sprockets 14 which have a horizontal pivotal support axis The conveyor 12, as in the previous embodiment, carries a plurality of spaced pan holding baskets 30 which permit pivotal rotation of the pan thereon. Just within the housing 66, from the loading station, a plurality of spaced washing header pipes 16 are disposed about the conveyor path to direct high pressure detergent water against the pan in similar fashion as the previous embodiment. Similar rotation imparting nozzles 18 are employed to turn each of the inverted cake pans and it is to be understood that a similar upward limiting pan movement bar 36 is also employed, as in FIG. 2 to prevent the pans from being raised off the baskets 30. Approximately midway along the housing length the pans enter a final elongated rinsing section employing rinse header supply tubes 72 and rotation imparting nozzles 18. In this embodiment the rinsing is accomplished in like manner to the washing under rotary motion imparted to the pans by the inclined jets 18.

Thus, it can be seen how the present invention represents a considerable mechanical simplification of applicant's prior patented arrangement. At the same time not only has the mechanism been significantly simplified by the elimination of the need for providing an adjustable hold down bar, but the machine is capable of washing multi depth pans placed therein in inter-mixed fashion. While obviously this capability would be of no particular novel consequence in a conveyorized washing machine wherein each pan is supported on its lowermost surface, it has always been a problem in conveyorized washing machines wherein the article being washed was supported in an inverted fashion where the force of the washing spray tended to raise the pans above the level of the conveyor. While applicant has chosen to illustrate his novel pan supporting and hold down technique in connection with a rotatable or non-rotatable basket for engaging the central hole coring member of an angel food cake pan, it should be realized that such arrangement is equally novel irrespective of the specific shape of the pan and irrespective also of pan rotation.

What I claim is:

1. A machine for cleaning baking pans having raised wall portions of varying heights in random intermixed sequence while traveling in inverted relation therethrough comprising, a housing, a conveyor means for transporting the baking pans through said housing, said conveyor means including a plurality of upstanding pan supports for rotationally supporting the bottoms of each of the inverted pans placed thereover, said pan supports extending to a height above said conveyor means greater than the largest depth of pan to be washed, fluid projecting means below said conveyor means for directing fluid upwardly to obliquely contact the inside wall portions of said pans and cause rotation thereof, and means located above said conveyor means substantially parallel thereto for limiting upward displacement of the rotating baking pans, said last mentioned means being fixedly located to said housing at a small predetermined height above the upper surface of said pan supports, said height being slightly in excess of the maximum thickness of the bottoms of the pans to be washed to permit free passage of the conveyor supported pans thereunder.

2. A machine for treating articles having raised wall portions of varying heights in random intermixed sequence while traveling in inverted relation therethrough comprising, a housing, conveyor means for transporting the articles through said housing, said conveyor means including a plurality of upstanding supports for supporting the bottoms of each of the inverted articles placed thereover, said supports extending to a height above said conveyor means greater than the largest interior depth of article to be treated, fluid projections means for directing fluid to contact the inside wall portions of said articles, and means located above said conveyor means substantially parallel thereto for limiting upward displacement of the articles, said last mentioned means being fixedly located to said housing at a small predetermined height above the upper surface of said supports, said height being slightly in excess of the maximum thickness of the bottoms of the articles to be treated to permit free passage of the conveyor supported articles thereunder.

3. In a machine for washing pans which are of various sizes and which have central hole coring members, a plurality of pan baskets each having a bottom end and a plurality of upstanding spoke members distributed about a central axis of the basket and extending upwardly from said bottom end thereof, each pan basket having a ring situated at and carried by upper ends of said spoke members so that said ring can directly engage the inner surface of a bottom wall of an inverted pan which has its core member extending into the interior of the basket, the interior of each of said baskets being completely free and unobstructed by any elements so that the core members of the pans can be received therein irrespective of the structural details of said core members, and each basket having a height which is at least as great as the height of the longest hole coring member of said pans of various sizes so that irrespective of the size of said pans the latter can be mounted on said baskets, conveyor means operatively connected to the bottom ends of said baskets for supporting the latter and for conveying said baskets through the machine along a predetermined path where the rings of said baskets are located substantially in a common plane, so that the bottom walls of pans supported by said baskets will also be located substantially in said plane irrespective of the sizes of said baskets, and stationary means located over and closely adjacent to said plane for limiting the extent to which pans may move upwardly away from said rings of said baskets during movement of said baskets along said path by said conveyor means, so that spraying devices which direct liquid against the interiors of the pans can raise them from said baskets only to the extent permitted by said stationary means.

4. In a machine as recited in claim 3, said stationary means, for limiting movement of the pans upwardly away from said rings of said baskets, including a pair of elongated stationary bars extending in the same general direction as the path along which said baskets are moved by said conveyor means, said bars being substantially parallel to each other and being spaced apart from each other by a distance which is substantially equal to the diameters of said rings.

5. In a machine for washing pans which are of various sizes and which have central hole coring members, a plurality of pan baskets each having a plurality of upstanding spoke members distributed about a central axis of each basket and each basket having a ring situated at and supported by upper ends of said spoke members and arranged substantially coaxially with respect to said axis, said spoke members each having at its bottom end an inwardly directed arm and said inwardly directed arms of said spoke members of each basket being joined to each other at said central axis and constituting at least part of a bottom end of each basket, the height of each basket being at least as great as the greatest height of the core members of various sizes so that pans can be supported by said baskets irrespective of the sizes of said pans, conveyor means engaging the bottom ends of said baskets substantially at the central axes thereof, respectively, to support said baskets for free rotary movement about their central axes, respectively, said conveyor means conveying said baskets through the machine along a path in which said rings are situated substantially in a common plane so that pans can be supported in inverted positions on said baskets with the bottom walls of said pans also located substantially in said plane and with the core members of said pans extending into the hollow interiors of said baskets, said hollow interiors of said baskets being completely free and unobstructed by any elements so that the core members of the pans can extend into the latter irrespective of the structural details of said core members, and a pair of elongated stationary bars situated over and located closely adjacent to said plane for limiting upward movement of said pans from said baskets as the latter are conveyed along said path by said conveyor means, whereby spray devices which direct sprays against the interiors of said pans cannot raise the pans upwardly away from the baskets to an extent sufficient to dismount the pans from the baskets.

6. In a machine as recited in claim 5, said bars extending in the same general direction as the path along which said baskets are conveyed by said conveyor means, and said bars being substantially parallel to each other and spaced from each other by a distance which is substantially equal to the diameters of said rings.

7. In a machine for washing pans which are of various sizes and which have central hole coring members, at least one pan basket having a plurality of upstanding spoke members distributed about a central axis of said basket and said basket having a ring situated at and supported by upper ends of said spoke members and arranged substantially coaxially with respect to said axis, said spoke members each having at its bottom end an inwardly directed arm and said inwardly directed arms of said spoke members of said basket being joined to each other at said central axis and constituting at least part of a bottom end of said basket, the height of said basket being at least as great as the greatest height of the core members of various sizes so that pans can be supported by said basket irrespective of the sizes of said pans, conveyor means engaging the bottom end of said basket substantially at the central axis thereof to support said basket for free rotary movement about the central axis, said conveyor means conveying said basket through the machine along a path in which said ring is situated substantially in a plane so that pans can be supported in inverted positions on said basket with the bottom walls of said pans also located substantially in said plane and with the core members of said pans extending into the hollow interior of said basket, said hollow interior of said basket being completely free and unobstructed by any elements so that the core members of the pans can extend into the latter irrespective of the structural details of said core members, and a pair of elongated stationary bars situated over and located closely adjacent to said plane for limiting upward movement of said pans from said basket as the latter is conveyed along said path by said conveyor means, whereby spray devices which direct sprays against the interiors of said pans cannot raise the pans upwardly away from the basket to an extent sufficient to dismount the pans from the basket.

References Cited by the Examiner

UNITED STATES PATENTS

| | | | |
|---|---|---|---|
| Re. 25,421 | 7/1963 | Nolte | 134—60 |
| 2,534,345 | 12/1950 | Farrar | 134—166 X |
| 2,838,025 | 6/1958 | Miller et al. | 118—322 |

CHARLES A. WILLMUTH, *Primary Examiner.*

R. L. BLEUTGE, *Assistant Examiner.*